United States Patent
Mutka

(10) Patent No.: US 9,338,016 B2
(45) Date of Patent: May 10, 2016

(54) METHOD AND APPARATUS FOR EXCHANGING MESSAGES

(71) Applicant: SENSINODE OY, Oulu (FI)

(72) Inventor: Petri Tapani Mutka, Tikkakoski (FI)

(73) Assignee: ARM FINLAND OY (FI)

( * ) Notice: Subject to any disclaimer, the term of this patent is extended or adjusted under 35 U.S.C. 154(b) by 108 days.

(21) Appl. No.: 13/942,750

(22) Filed: Jul. 16, 2013

(65) Prior Publication Data

US 2014/0023083 A1  Jan. 23, 2014

(30) Foreign Application Priority Data

Jul. 18, 2012 (FI) ........................ 20125808

(51) Int. Cl.
H04L 12/12 (2006.01)
H04L 1/16 (2006.01)
H04W 4/00 (2009.01)

(52) U.S. Cl.
CPC .............. *H04L 12/12* (2013.01); *H04L 1/1614* (2013.01); *H04L 1/1664* (2013.01); *H04L 1/1671* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 5,245,616 A * | 9/1993 | Olson | 714/748 |
| 7,797,604 B2 | 9/2010 | Lee et al. | |
| 7,813,324 B1 | 10/2010 | Goel et al. | |
| 8,300,620 B1 * | 10/2012 | Sarkar et al. | 370/349 |
| 2003/0061557 A1 | 3/2003 | Chao et al. | |
| 2004/0044761 A1 * | 3/2004 | Phillipi et al. | 709/223 |
| 2004/0184430 A1 * | 9/2004 | Jones et al. | 370/346 |
| 2004/0184442 A1 * | 9/2004 | Jones et al. | 370/351 |
| 2008/0089347 A1 * | 4/2008 | Phillipi et al. | 370/400 |
| 2008/0117915 A1 * | 5/2008 | Khirman | 370/394 |
| 2008/0274689 A1 * | 11/2008 | Kuban | 455/7 |
| 2008/0310361 A1 * | 12/2008 | Cho et al. | 370/329 |
| 2009/0040926 A1 * | 2/2009 | Li et al. | 370/230.1 |
| 2009/0225700 A1 | 9/2009 | Shen et al. | |
| 2011/0019756 A1 * | 1/2011 | Chun et al. | 375/260 |
| 2011/0041024 A1 * | 2/2011 | Burbidge et al. | 714/749 |
| 2011/0142020 A1 * | 6/2011 | Kang et al. | 370/338 |
| 2011/0228794 A1 * | 9/2011 | Yong et al. | 370/412 |
| 2012/0110403 A1 * | 5/2012 | Chen et al. | 714/748 |
| 2012/0226820 A1 * | 9/2012 | Li et al. | 709/242 |
| 2013/0166982 A1 * | 6/2013 | Zheng et al. | 714/748 |

OTHER PUBLICATIONS

Finnish Search Report Patent Application No. 20125808, dated May 10, 2013.

* cited by examiner

*Primary Examiner* — Bunjob Jaroenchonwanit

(74) *Attorney, Agent, or Firm* — Barnes & Thornburg LLP

(57) ABSTRACT

A method and an apparatus for communicating with a second apparatus. The apparatus includes a controller and a transceiver for exchanging a predetermined number of data fields between the apparatuses by transmitting and receiving frames having one or more data fields and including in each frame a field indicating which data fields the apparatus has not yet received successfully.

14 Claims, 4 Drawing Sheets

METHOD AND APPARATUS FOR EXCHANGING MESSAGES

PRIORITY CLAIM

This patent application claims priority to Finnish Patent Application No. 20125808, filed 18 Jul. 2012, the disclosure of which is incorporated herein by reference in its entirety.

FIELD

Disclosed embodiments relate to a method and an apparatus in a packet network. In particular, disclosed embodiments relate to exchanging messages between entities in a packet network.

BACKGROUND

The following description of background art may include insights, discoveries, understandings or disclosures, or associations together with disclosures not known to the relevant art prior to the present disclosed embodiments but provided by the disclosed embodiments. Some of such contributions may be specifically pointed out below, whereas other such contributions will be apparent from their context.

In modern communication and computer networks, data exchange between programs and computers is a vital element. Information must be exchanged reliably. For this reason, in many applications the recipients of messages are required to acknowledge the successful reception of the messages. This applies especially to networks utilizing packet based transmission.

Many solutions for ensuring reliable transmission have been developed. However, these solutions do not take into account the existence of constrained networks, i.e., networks having limited resources, power and bandwidth available for communication. An example of a constrained network is a machine-to-machine (M2M) network realized using low-power wireless connections.

Especially in large M2M networks with large numbers of devices with small processing power and minimum power consumption it is important to utilize efficient solutions for communication.

SUMMARY

Disclosed embodiments provide an improved solution for exchanging messages between entities in a packet network.

At least one disclosed embodiment provides an apparatus, in a packet network, comprising at least one processor; and at least one memory including computer program code, the at least one memory and the computer program code configured to, with the at least one processor, cause the apparatus at least to perform: communicate with a second apparatus by exchanging a predetermined number of data fields between the apparatuses by transmitting and receiving frames comprising one or more data fields; including in each frame a field indicating which data fields the apparatus has not yet received successfully.

Another disclosed embodiment provides a method, comprising method in a packet network apparatus, comprising: communicating with a second apparatus by exchanging a predetermined number of data fields between the apparatuses by transmitting and receiving frames comprising one or more data fields; and including in each frame a field indicating which data fields the apparatus has not yet received successfully.

BRIEF DESCRIPTION OF THE DRAWINGS

Disclosed embodiments are described below, by way of example only, with reference to the accompanying drawings, in which.

DETAILED DESCRIPTION OF THE DISCLOSED EMBODIMENTS

Figure 1:
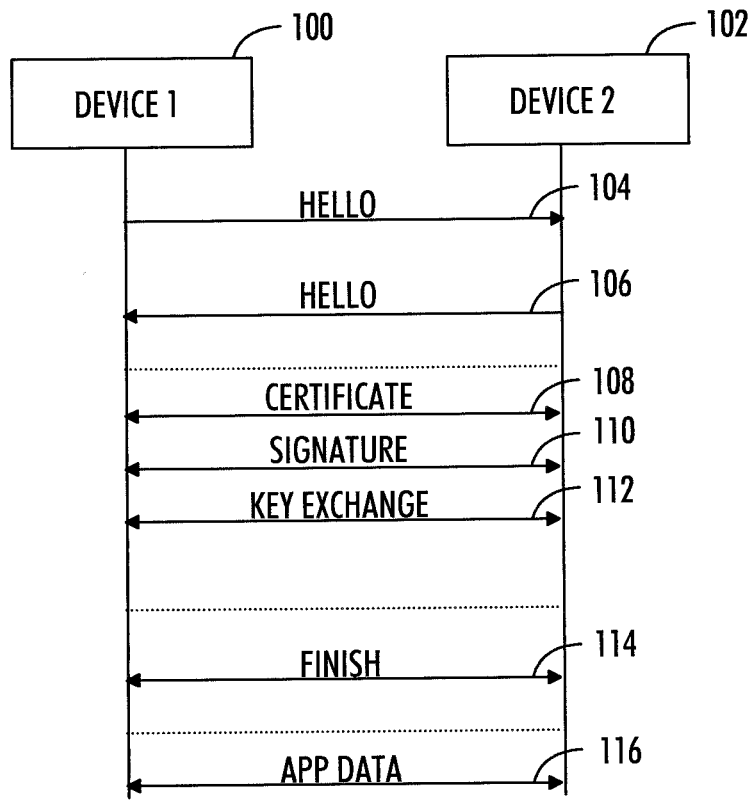
FIG. 1 illustrates an example of an authentication procedure where two devices perform authentication.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

In some, if not most, communication between computers the sender of a message requires an acknowledgement from the recipient so that the sender may be sure that the message has been received. Examples of this kind of communication are authenticated and/or encrypted connections.

In computer networks, authenticated and encrypted connections require a handshake when a connection between two peers is established. A cryptographic handshake requires reliable exchange of cryptographic parameters and data. In the TCP network environment, this is done with an encryption protocol called the Transport Layer Security TLS, where the transmission layer guarantees ordering and delivery of transmitted packets, and takes care of fragmentation. In radio packet networks and other constrained environments, implementation of the TCP is problematic.

For this reason the use of User Datagram Protocol UDP based solutions have been proposed. An example of a UDP based solution is Datagram Transport Layer Security DTLS, which is an encryption protocol that is used for authorization, authentication and securing of data traffic on the UDP. However, DTLS solves the handshake message delivery by implementing a TCP-like traffic control at the authentication layer. This approach is cumbersome and neglects the advantages of the UDP protocol.

In at least one disclosed embodiment, an improved solution for exchanging messages between entities is proposed. The proposed method for handshake data exchange does not need any external traffic control (provided by TCP/IP, for example). It is configured to work in networks where there is no guarantee of reliable message delivery, nor resend or congestion control mechanisms. Furthermore, the message ordering may be arbitrary.

In the proposed solution, two entities are exchanging a predetermined number of data fields. In another disclosed embodiment, the entities are configured to exchange the same data fields. The exchange may be realized by transmitting frames or messages between the entities, the frames or messages comprising one or more data fields each. The entities are configured to include in each frame or message a field indicating which data fields the transmitting entity has not yet received successfully. The field may be denoted as an ACK field. In yet another disclosed embodiment, the ACK field is a bit field comprising an acknowledgment bit for each handshake data fields to be exchanged.

In another disclosed embodiment, each sent frame is included with an ACK field, where the sender is communicating which handshake data fields it has not yet received. The receiver of the frame must (re)send all the indicated data fields, and send its own corresponding ACK field with the reply frame. The data exchange is continued until the both peers have sent and received frames with ACK fields indicating that all required data fields have been successfully received.

FIG. 1 illustrates an example of an authentication procedure where two devices 100, 102, perform authentication by exchanging a given number of data fields, namely certificate, signature and key exchange data fields.

The process starts with exchanging hello data fields 104, 106 between the devices which initiate the exchange. Next, the devices exchange frames comprising certificate 108, signature 110 and key exchange 112 data fields. Each frame with one or more of the above mentioned data fields comprises in addition an ACK field which indicates the data fields the sender of the frame has received. The exchange of these data fields continues until both devices are able to send an ACK field 114 indicating that all data fields have been received. When that happens, the authentication has been completed and the devices may begin exchanging application data 116.

Figure 2:
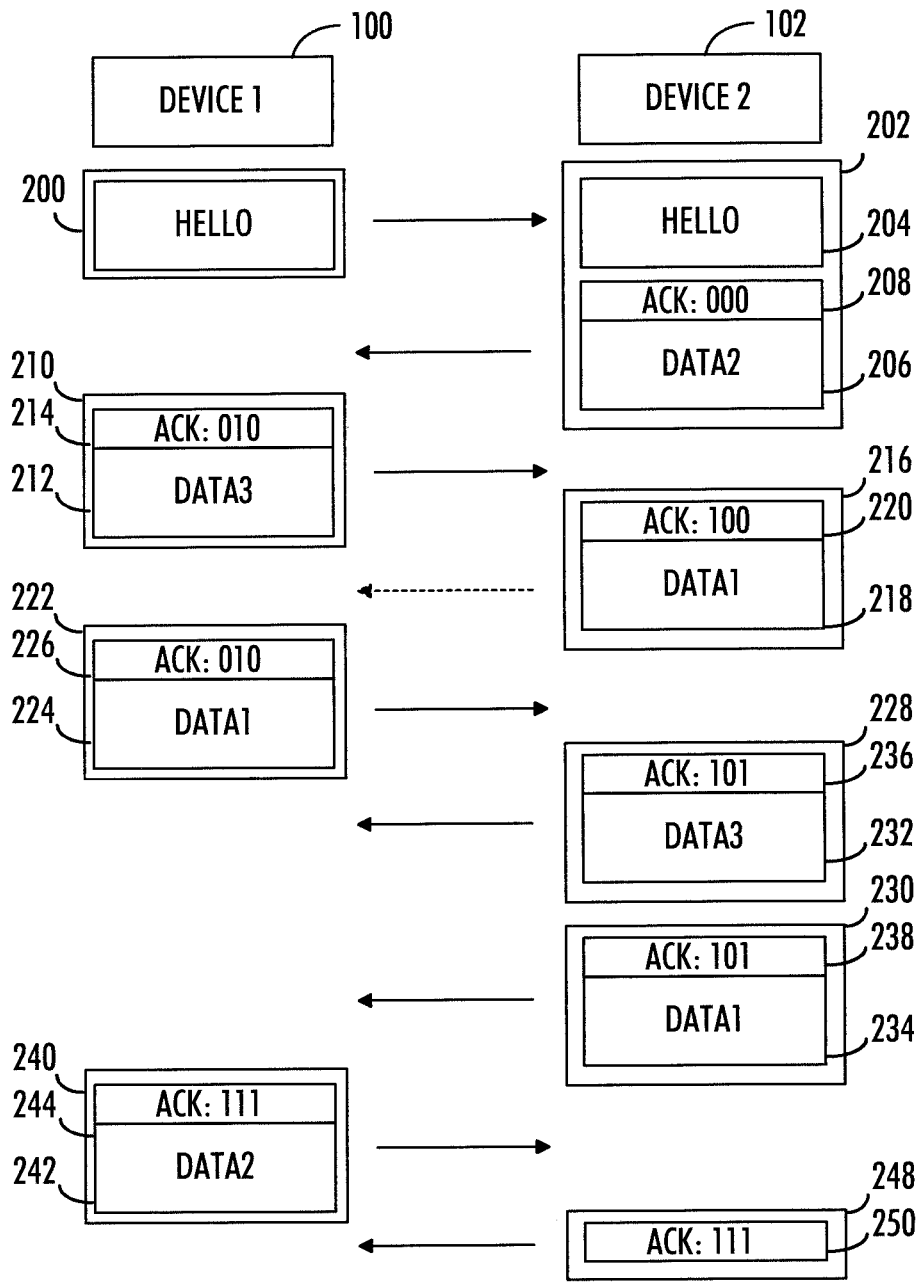
FIG. 2 illustrates an example where two devices exchange data.

FIG. 2 illustrates another example where two devices 100, 102 are configured to exchange three data fields, data1, data2 and data3. The order in which the data fields are exchanged is arbitrary. A dashed line represents an unsuccessful transmission.

First, the first device 100 transmits a frame 200 comprising a hello data field. The second device 102 transmits a frame 202 comprising a hello data field 204 and data2 data field 206. The frame comprises an ACK field 208 with values 000 indicating that the second device has not received any of the three required data fields yet. In this example, bits of the ACK field are ordered as data3, data2 and data1 from left to right.

The first device transmits a frame 210 comprising data3 data field 212 and an ACK field 214 with values 010 indicating that it has received data field data2 but no other fields. The second device transmits a frame 216 comprising data1 data field 218 and an ACK field 220 with values 100 indicating that it has received data field data3 but no other fields. However, this transmission is unsuccessful. The first device transmits a frame 222 comprising data1 data field 224 and an ACK field 226 with values 010 indicating that it has received data field data2 but no other fields. As the previous transmission of the second device comprising data1 was unsuccessful the ACK field denotes data1 as not received.

Next in this example, the second device transmits two frames 228, 230 comprising data fields data3 232 and data1 234, correspondingly. Both of the frames 228, 230 comprise ACK fields 236, 238 with values 101 indicating that data3 and data1 have been received.

As the first device has now successfully received all three data fields it updates the values of ACK field 244 in its next frame 240 as 111. From the last frame received from the second device the first device notices that the second device has not yet received data2. Thus, it transmits the frame 240 with data2 field 242. Finally, the second device transmits a frame 248 comprising ACK field 250 with values 111. There is no need to transmit any data fields and the previous frame from the first device indicated that it had received all required data fields.

Figure 3:
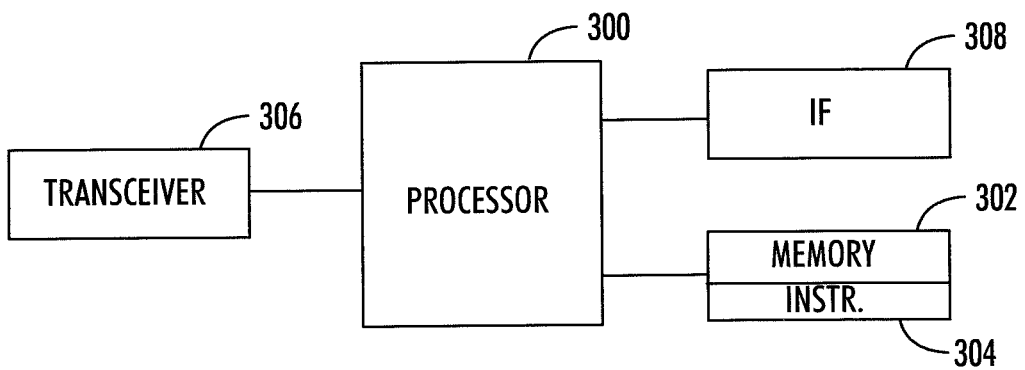
FIG. 3 illustrates an example of a device in which some disclosed embodiments may be applied.

FIG. 3 illustrates a further disclosed embodiment. The figure illustrates a simplified example of a device in which some disclosed embodiments may be applied. In some disclosed embodiments, the device may be a node of a machine-to-machine constrained packet network. In some disclosed embodiments, the device may be user equipment UE or a respective device communicating with a communications network. In some disclosed embodiments, the device may be a part of user equipment or a respective device. In general, device may a computing device, including wireless mobile communication device operating with or without a subscriber identification module (SIM).

In at least one disclosed embodiment, the device may have limited memory and processing capabilities, may sleep most of the time, and operate using a constrained network technology.

It should be understood that the apparatus is depicted herein as an example illustrating some embodiments. It is apparent to a person skilled in the art that the device may also comprise other functions and/or structures and not all described functions and structures are required. Although the device has been depicted as one entity, different modules and memory may be implemented in one or more physical or logical entities.

The device of the example includes a control circuitry 300 configured to control at least part of the operation of the device.

The device may comprise a memory 302 for storing data. Furthermore the memory may store software instructions 304 executable by the control circuitry 300. The memory may be integrated in the control circuitry.

The device comprises a transceiver 306. The transceiver is operationally connected to the control circuitry 300. The transceiver is configured to communicate with a packet network which may be a machine-to-machine network, a constrained network or any other type of communication network.

The software 304 may comprise a computer program comprising program code means adapted to cause the control circuitry 300 of the device to control a transceiver 306. The device may be The device may further comprise interface 308 operationally connected to the control circuitry 300. The device may be operationally connected to one or more external devices.

The control circuitry 300 is configured to execute one or more applications. The applications may be stored in the memory 302. The applications may configure the device to communicate with another device utilizing methods described above. The applications may require data from another device or they may store data another device.

In at least one disclosed embodiment, when exchanging data (data fields, messages and/or frames) with another device, the device may have a buffer for data fields to be transmitted. The buffer may be a reserved part of the memory 302 or it may be in another memory unit.

In another disclosed embodiment, the buffer may be an automatic send buffer, that (re)sends all the contents of the buffer a fixed number of times at predefined intervals, and quits after the final retry if there is no further communication from the other device. A device inserts all the frames to be sent into this buffer. Any communication from the other device flushes the stored messages from the send buffer.

Figure 4A:
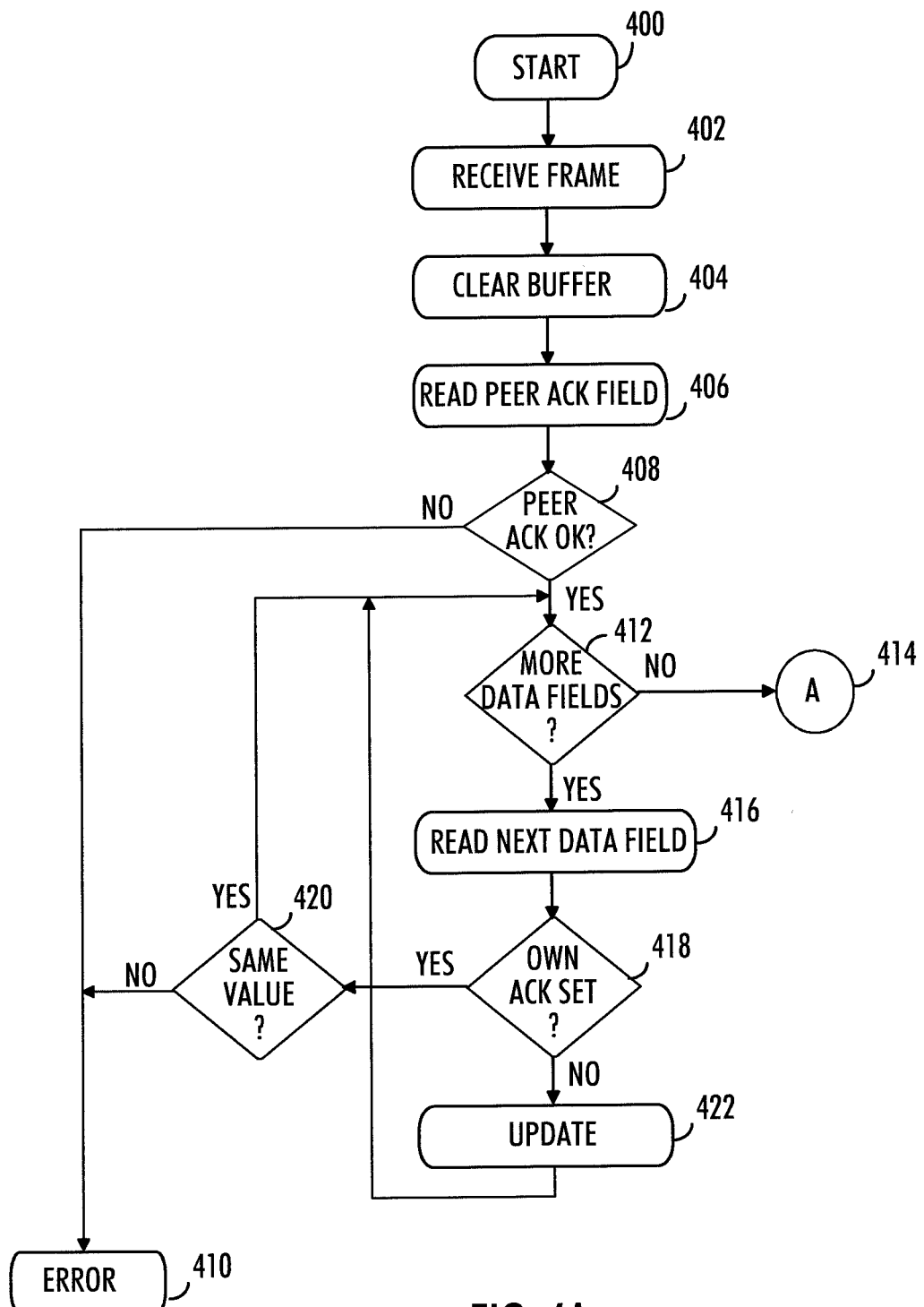
FIGS. 4A and 4B are flowcharts illustrating an example of at least one disclosed embodiment.
Figure 4B:
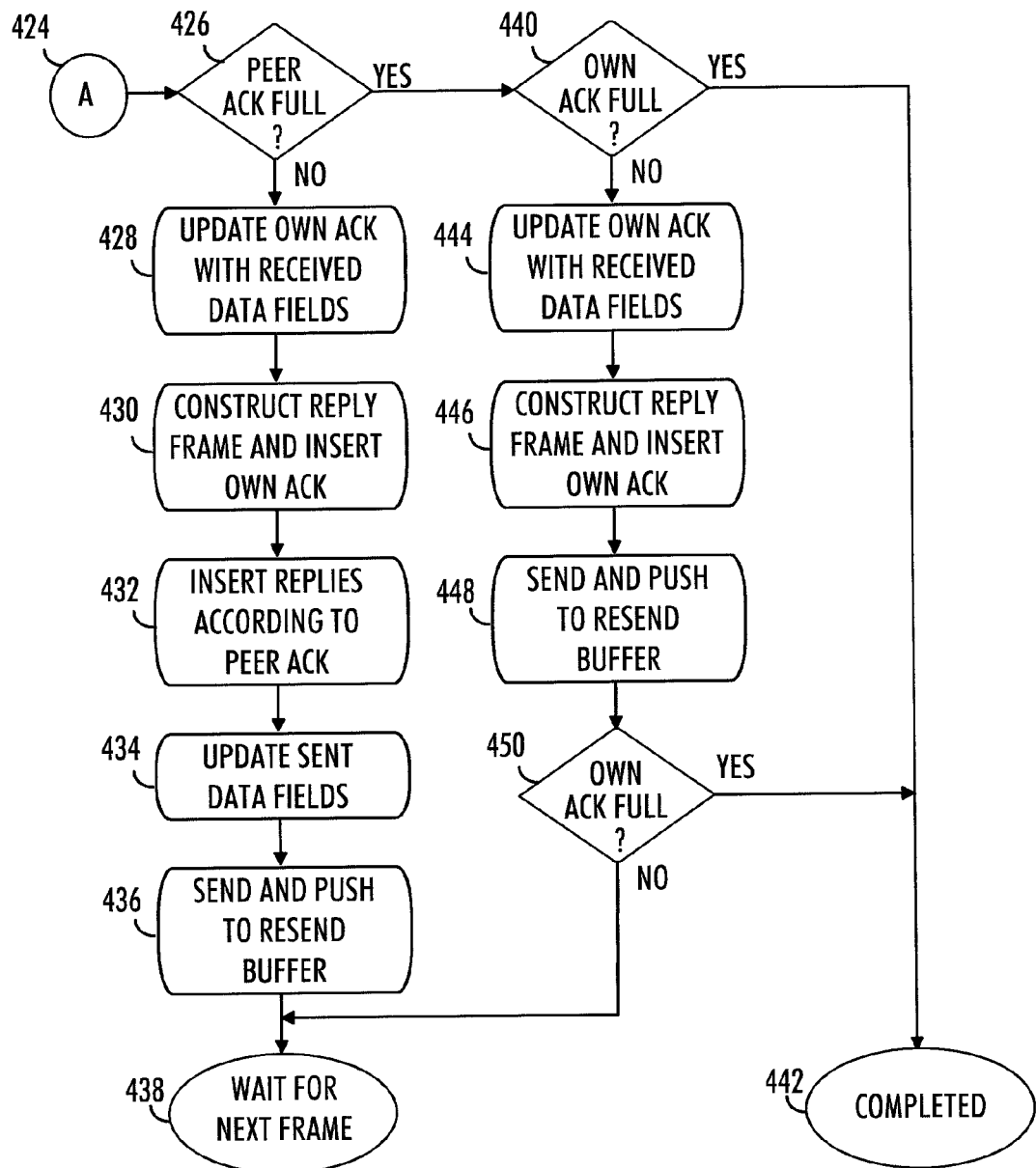

FIGS. 4A and 4B are flow charts illustrating an example of at least one disclosed embodiment. The flow charts illustrate the operation of a device communicating with another device by exchanging data fields in frames where each frame comprises an ACK field.

Figure 5A:
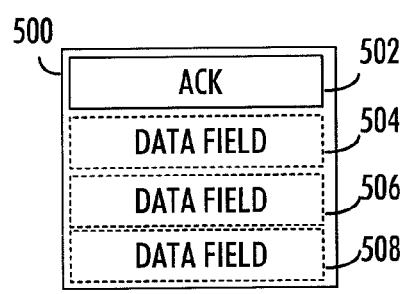
FIG. 5A illustrates an example of a frame comprising data fields.

FIG. 5A illustrates an example of a frame comprising data fields. The frame 500 comprises an ACK field 502 indicating the data fields the sender of the frame has not yet received successfully. The frame optionally comprises one or more data fields 504, 506, 508.

Figure 5B:
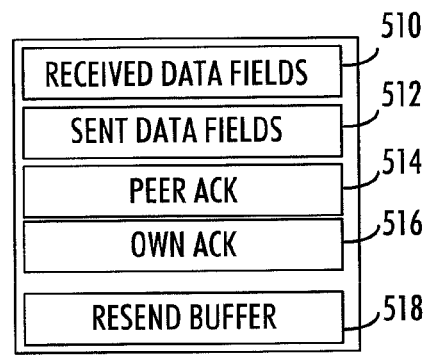
FIG. 5B illustrates an example of variables stored in a device.

FIG. 5B illustrates state variables stored in the device and related to the exchanging of data fields. The device stores information on received data fields 510, sent data fields 512, ACK field 514 of the peer, i.e., the other device the device is communicating with and ACK field 516 of the device itself. In addition, the device keeps a resend buffer 518.

The process for exchanging data fields starts in step 400 of FIG. 4A.

In step 402, a device receives a frame from the other device. In at least one disclosed embodiment, the frame is of the format shown in FIG. 5A, i.e., it comprises an ACK field and optionally one or more data fields.

In step 404, the device empties the resend buffer 518.

In step 406, the peer ACK field is read from the received frame.

In step 408, the device is configured to check the received peer ACK for consistency. In another disclosed embodiment, the received ACK is compared to the sent messages 512 in order to avoid accepting forged ACKs for messages that have not been (yet) sent by the device. The received ACK may also be compared to the earlier peer ACKs received (which may be stored by the device) in order to detect tampering (switching acked and processed data fields to unacked). If the received ACK field is not consistent the process ends in step 410. If yes, the stored peer ACK field 514 is updated.

In step 412, it is checked whether the frame comprises data fields not yet processed. If not the process continues 414 according to the flow chart described later in connection with FIG. 4B.

If yes, the next data field is read from the frame in step 416.

In step 418, it is checked if the ACK field 516 of the device indicates that the data field has already been received successfully.

If not, the received data fields 510 are updated in step 422.

If yes, it is checked in step 420 if the received data field has the same value if the previously received data field 510. If yes, the resending of the data field is ignored and the process continues in step 412. If not, there is an error and the process ends in step 410.

The process for exchanging data fields continues in step 424 of FIG. 4B.

In step 426, the device is configured to check whether the peer ACK 514 is full, i.e., whether the peer has received all data fields. In such a case there would be no need to transmit any data fields to the peer.

If not, the own ACK 516 is updated in step 428. The ACK value for data fields which were received in the last frame are marked as received.

In step 430, a reply frame is constructed. The ACK of the device 516 is inserted into the frame. Furthermore, it is checked whether there are data fields to be sent to the peer and space is reserved for one or more data fields.

In step 432, one or more data field values are inserted into the frame according to the peer ACK field.

In step 434, the sent data fields 512 variable is updated.

In step 436, the frame is sent and stored in the resend buffer 518. In yet another disclosed embodiment, the device is configured to send the contents of the resend buffer 518 a fixed number of times at predetermined intervals.

The process continues in step 438 by waiting the next frame from the peer.

If the peer ACK was full is step 426, i.e., the peer has received all data fields, the process continues in step 440 by checking whether the ACK 514 of the device is full, i.e., whether the device has received all data fields. If yes, the exchange of data fields is completed and the process ends in step 442.

If not, the own ACK 516 is updated in step 444. The ACK value for data fields which were received in the last frame are marked as received.

In step 446, a reply frame is constructed. The ACK of the device 516 is inserted into the frame. In this case, there is no need to reserve space for one or more data fields as the peer has already received all data fields. Thus, the frame comprises only the ACK buffer.

In step 448, the frame is sent and stored in the resend buffer 518. In still another disclosed embodiment, the device is configured to send the contents of the resend buffer 518 a fixed number of times at predetermined intervals.

In step 450, the process continues by checking whether the ACK 514 of the device is full, i.e., whether the device has received all data fields. If yes, the exchange of data fields is completed and the process ends in step 442.

If not, the process continues in step 438 by waiting the next frame from the peer.

The proposed solution is more lightweight than the usual traffic control solutions during the handshake that are based on sequencing and caching of the messages. The scheme is based on adaptation to the transport layer properties instead of forcing the transport layer to work in a sequential way. Therefore it is more lightweight and simpler than the usual implementations. Optimally, the number of sent messages is also less.

The proposed solution can be used in any context where two peers must exchange the data fields with peer related individual values. In a further disclosed embodiment, the number of data fields to be exchanges is the same in both directions. An example of such situation is a security handshake. An example is an authenticated asymmetric TLS-like exchange between a client and a server.

In at least one disclosed embodiment, the number of data fields to be exchanges is different in different directions.

In another disclosed embodiment, the device implementing aspects may be realized as software, or computer program or programs in a processing system.

In a further disclosed embodiment, the apparatus implementing aspects may be realized as software in a node, a server, a computer or a set of computers of a web service system connected to Internet.

The computer programs may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

It will be obvious to a person skilled in the art that, as technology advances, the inventive concept can be implemented in various ways. The disclosed embodiments are not limited to the examples described above but may vary within the scope of the claims.

The invention claimed is:

1. An apparatus in a packet network, the apparatus comprising:
    at least one processor; and
    at least one memory including computer program code, the at least one memory and the computer program code being configured to, with the at least one processor, cause the apparatus at least to:
        communicate with a second apparatus by exchanging a predetermined number of data fields to perform authentication by transmitting frames to the second apparatus and receiving frames from the second apparatus, wherein the frames comprise the predetermined number of data fields to perform authentication, wherein the authentication exchange between the apparatus and the second apparatus is continued until both the apparatus and the second apparatus have each sent and received all of the frames comprising the predetermined number of data fields required for authentication along with acknowledgement fields indicating that all the predetermined number of data fields have been successfully received; and
        include, in each frame transmitted to the second apparatus, a field indicating which data fields of the predetermined number of data fields required for authentication the apparatus has not yet received successfully.

2. The apparatus of claim 1, wherein the apparatus is configured to receive from the second apparatus frames indicating which data fields the second apparatus has not yet received successfully, and transmit the indicated data fields to the second apparatus.

3. The apparatus of claim 1, wherein the apparatus is configured to continue the transmission of data fields required for authentication until receiving a frame with an acknowledgement field indicating that all data fields have been received successfully.

4. The apparatus of claim 1, wherein the apparatus is configured to transmit the predetermined number of data fields to the second apparatus and receive the same predetermined number of data fields from the second apparatus.

5. The apparatus of claim 1, wherein the apparatus is configured to transmit a first predetermined number of data fields to the second apparatus and receive a second predetermined number of data fields from the second apparatus, wherein the first and second predetermined numbers are different.

6. A method in a packet network apparatus, the method comprising:
    communicating with a second apparatus by exchanging a predetermined number of data fields to perform authentication by transmitting and receiving frames comprising the predetermined number of data fields to perform authentication; and
    including, in each frame transmitted to the second apparatus, a field indicating which data fields of the predetermined number of data fields required for authentication the packet network apparatus has not yet received successfully,
    wherein the authentication exchange between the apparatus and the second apparatus is continued until both the packet network apparatus and the second apparatus have each sent and received all of the frames comprising the predetermined number of data fields required for authentication along with acknowledgement fields indicating that all the predetermined number of data fields have been successfully received.

7. The method of claim 6, further comprising:
    receiving from the second apparatus frames indicating which data fields the second apparatus has not yet received successfully; and
    transmitting the indicated data fields to the second apparatus.

8. The method of claim 6, further comprising continuing the transmission of data fields until receiving a frame with acknowledgement field indicating that all data fields have been received successfully.

9. The method of claim 6, further comprising transmitting the predetermined number of data fields to the second apparatus and receiving the same predetermined number of data fields from the second apparatus.

10. The method of claim 6, further comprising transmitting a first predetermined number of data fields to the second apparatus and receiving a second predetermined number of data fields from the second apparatus, wherein the first and second predetermined numbers are different.

11. A non-transitory computer program product encoding a computer program of instructions for executing a computer process carrying out the method according to claim 6.

12. A non-transitory computer program distribution medium readable by a computer and encoding a computer program of instructions for executing a computer process carrying out the method according to claim 6.

13. The apparatus of claim 1, wherein the order in which the data fields are exchanged is arbitrary.

14. The method of claim 6, wherein the order in which the data fields are exchanged is arbitrary.

* * * * *